US008375300B2

(12) United States Patent
Abe

(10) Patent No.: US 8,375,300 B2
(45) Date of Patent: Feb. 12, 2013

(54) ELECTRONIC ILLUSTRATED DICTIONARY DEVICE, ILLUSTRATED DICTIONARY DISPLAY METHOD, AND STORAGE MEDIUM STORING PROGRAM FOR PERFORMING ILLUSTRATED DICTIONARY DISPLAY CONTROL

(75) Inventor: Takatoshi Abe, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/223,735

(22) Filed: Sep. 1, 2011

(65) Prior Publication Data
US 2012/0066575 A1    Mar. 15, 2012

(30) Foreign Application Priority Data

Sep. 9, 2010   (JP) .................................. 2010-202366

(51) Int. Cl.
*G06F 17/00* (2006.01)
(52) U.S. Cl. ........................................................ 715/259
(58) Field of Classification Search .................. 715/205, 715/256, 259; 704/9, 10
See application file for complete search history.

(56) References Cited

U.S. PATENT DOCUMENTS

| | | | | |
|---|---|---|---|---|
| 5,404,514 A | * | 4/1995 | Kageneck et al. ..................... | 1/1 |
| 5,860,075 A | * | 1/1999 | Hashizume et al. ........... | 715/210 |
| 5,963,205 A | * | 10/1999 | Sotomayor .................... | 715/236 |
| 6,064,952 A | * | 5/2000 | Imanaka et al. .................. | 704/9 |
| 6,081,774 A | * | 6/2000 | de Hita et al. ..................... | 704/9 |
| 6,199,034 B1 | * | 3/2001 | Wical ................................ | 704/9 |
| 6,279,018 B1 | * | 8/2001 | Kudrolli et al. ............... | 715/234 |
| 6,396,951 B1 | * | 5/2002 | Grefenstette ................ | 382/187 |
| 6,601,026 B2 | * | 7/2003 | Appelt et al. .................... | 704/9 |
| 6,735,559 B1 | * | 5/2004 | Takazawa ........................ | 704/7 |
| 6,910,003 B1 | * | 6/2005 | Arnold et al. .................... | 704/4 |
| 7,013,264 B2 | * | 3/2006 | Dolan et al. ...................... | 704/9 |
| 2003/0069880 A1 | * | 4/2003 | Harrison et al. ................... | 707/3 |
| 2004/0006460 A1 | * | 1/2004 | Katayama et al. ............. | 704/10 |
| 2005/0108001 A1 | * | 5/2005 | Aarskog ........................ | 704/10 |
| 2005/0267735 A1 | * | 12/2005 | Kharrat .............................. | 704/4 |
| 2007/0106492 A1 | * | 5/2007 | Kim ................................. | 704/9 |
| 2008/0133508 A1 | * | 6/2008 | Jiang et al. ........................ | 707/5 |
| 2008/0147663 A1 | * | 6/2008 | Vernau et al. ..................... | 707/7 |
| 2009/0106798 A1 | * | 4/2009 | Nabatani et al. ................ | 725/46 |
| 2009/0210411 A1 | * | 8/2009 | Murata et al. .................... | 707/5 |

FOREIGN PATENT DOCUMENTS

JP    2004-213299    7/2004

* cited by examiner

*Primary Examiner* — Laurie Ries
(74) *Attorney, Agent, or Firm* — Turocy & Watson, LLP

(57) ABSTRACT

An electronic illustrated dictionary device includes an illustration highlighter character string hiding unit configured to execute a process of, when an illustration associated with an expository content of an arbitrary headword is displayed on the display unit according to a user operation, displaying a character string highlighted with a highlighter by the illustration highlighter adding unit in invisible form, and a link destination highlighter character string hiding unit configured to execute a process of, when the in-illustration textual content display unit displays an expository content having a character string as a headword highlighted with a highlighter by the illustration highlighter adding unit on the display unit, displaying a character string highlighted with a highlighter by the link destination highlighter adding unit in invisible form.

7 Claims, 11 Drawing Sheets

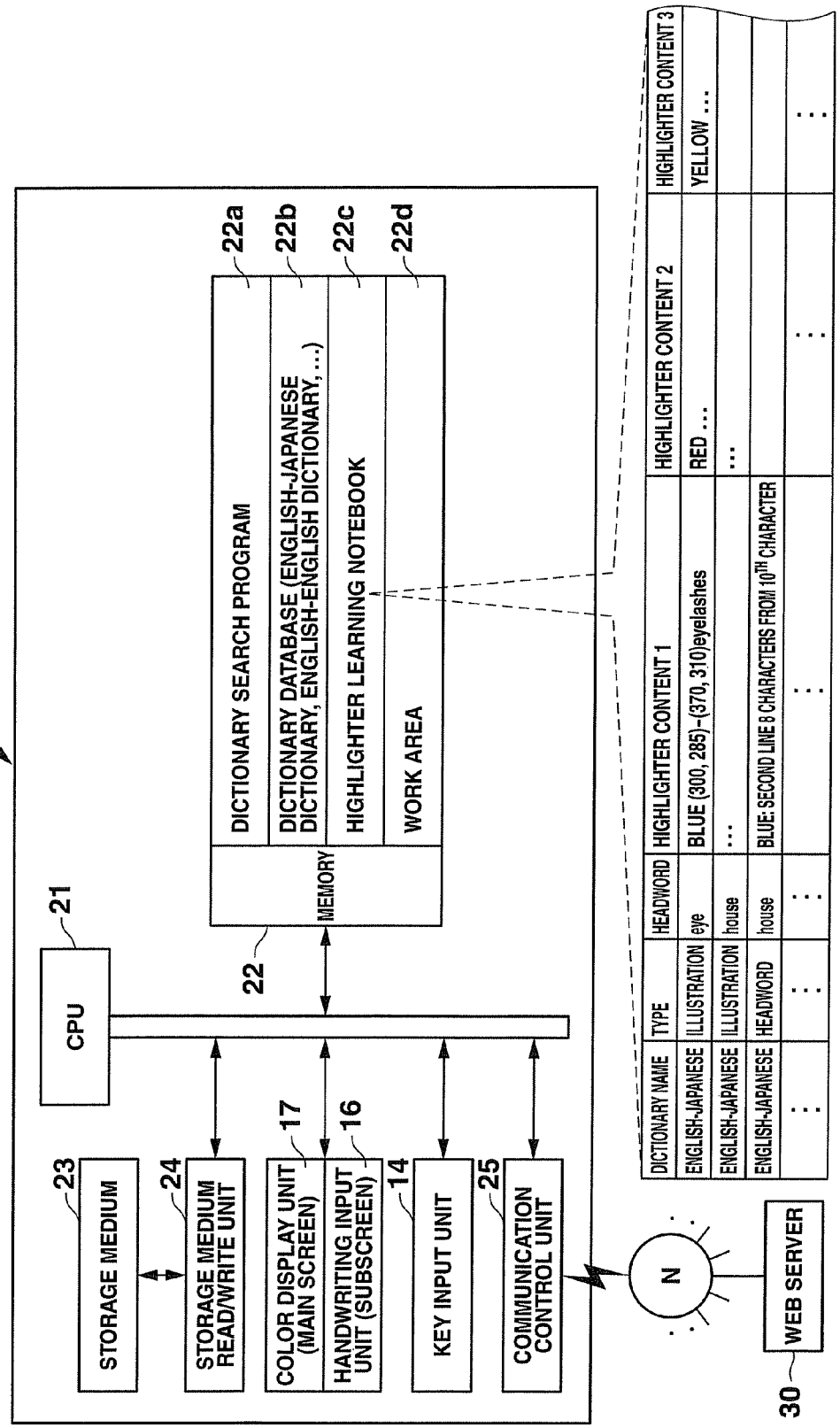

FIG.4

ELECTRONIC ILLUSTRATED DICTIONARY DEVICE, ILLUSTRATED DICTIONARY DISPLAY METHOD, AND STORAGE MEDIUM STORING PROGRAM FOR PERFORMING ILLUSTRATED DICTIONARY DISPLAY CONTROL

CROSS-REFERENCE TO RELATED APPLICATIONS

This application is based upon and claims the benefit of priority from prior Japanese Patent Application No. 2010-202366, filed Sep. 9, 2010, the entire contents of which are incorporated herein by reference.

BACKGROUND OF THE INVENTION

1. Field of the Invention

The present invention relates to an electronic illustrated dictionary device with a highlighter function, an illustrated dictionary display method, and a storage medium storing program for performing illustrated dictionary display control.

2. Description of the Related Art

One known electronic dictionary device with a wordbook function enables the user to register a desired headword retrieved from a dictionary in a user's personal wordbook and call up a registered word in the personal wordbook on the screen as needed.

Another known electronic dictionary device with a highlighter function enables the user to highlight a notable character string (or word) with a highlighter on a screen on which a desired headword retrieved from a dictionary and its expository content are displayed.

In addition, an electronic dictionary device with a combination of the wordbook function and the highlighter function can be considered.

In recent electronic dictionary devices, an illustration to supplement an explanation is added to an expository content on a headword. A character string (or word) in the illustration is linked with a headword in the dictionary. Specifying the character string in the illustration enables a jump to be made to an expository content having the character string as a headword and the expository content to be displayed.

However, it is impossible to highlight a notable character string in the illustration with a highlighter and register the highlighted character string. It is thus desired that a highlighter function of highlighting a notable character string in the illustration with a highlighter will be realized and use of the highlighter function will enable more effective learning.

BRIEF SUMMARY OF THE INVENTION

Accordingly, it is an object of the invention to provide an electronic illustrated dictionary device, an illustrated dictionary display method, and a storage medium storing program for performing illustrated dictionary display control, which realize a highlighter function of highlighting a character string in an illustration added to an expository content on a headword and enable more effective learning with the help of the highlighter function.

According to one aspect of the present invention, there is provided an electronic illustrated dictionary device, comprising: a dictionary storing unit configured to store dictionary data in which each headword, expository content, and illustration are associated with one another, the illustration including a character string which is searchable; an in-illustration textual content display unit configured to execute a process of, when an arbitrary character string in an arbitrary illustration is specified according to a user operation, displaying an expository content having the specified character string as a headword on a display unit; an illustration highlighter adding unit configured to highlight an arbitrary character string in the displayed illustration with a highlighter according to a user operation; a link destination highlighter adding unit configured to execute a process of, when the in-illustration textual content display unit displays an expository content having the character string as a headword highlighted with the highlighter by the illustration highlighter adding unit on the display unit, detecting the same character string in the displayed expository content as the character string highlighted with the highlighter as a link destination and highlighting the same character string with a highlighter; an illustration highlighter character string hiding unit configured to execute a process of, when an illustration associated with an expository content of an arbitrary headword is displayed on the display unit according to a user operation, displaying a character string highlighted with a highlighter by the illustration highlighter adding unit in invisible form; and a link destination highlighter character string hiding unit configured to execute a process of, when the in-illustration textual content display unit displays an expository content having a character string as a headword highlighted with a highlighter by the illustration highlighter adding unit on the display unit, displaying a character string highlighted with a highlighter by the link destination highlighter adding unit in invisible form.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a configuration of the electric circuitry of the electronic dictionary device 10;

FIG. 4 shows a dictionary content display operation (part 1) accompanying the content display control process of the electronic dictionary device 10;

DETAILED DESCRIPTION OF THE INVENTION

Hereinafter, referring to the accompanying drawings, embodiments of the invention will be explained.

Figure 1:
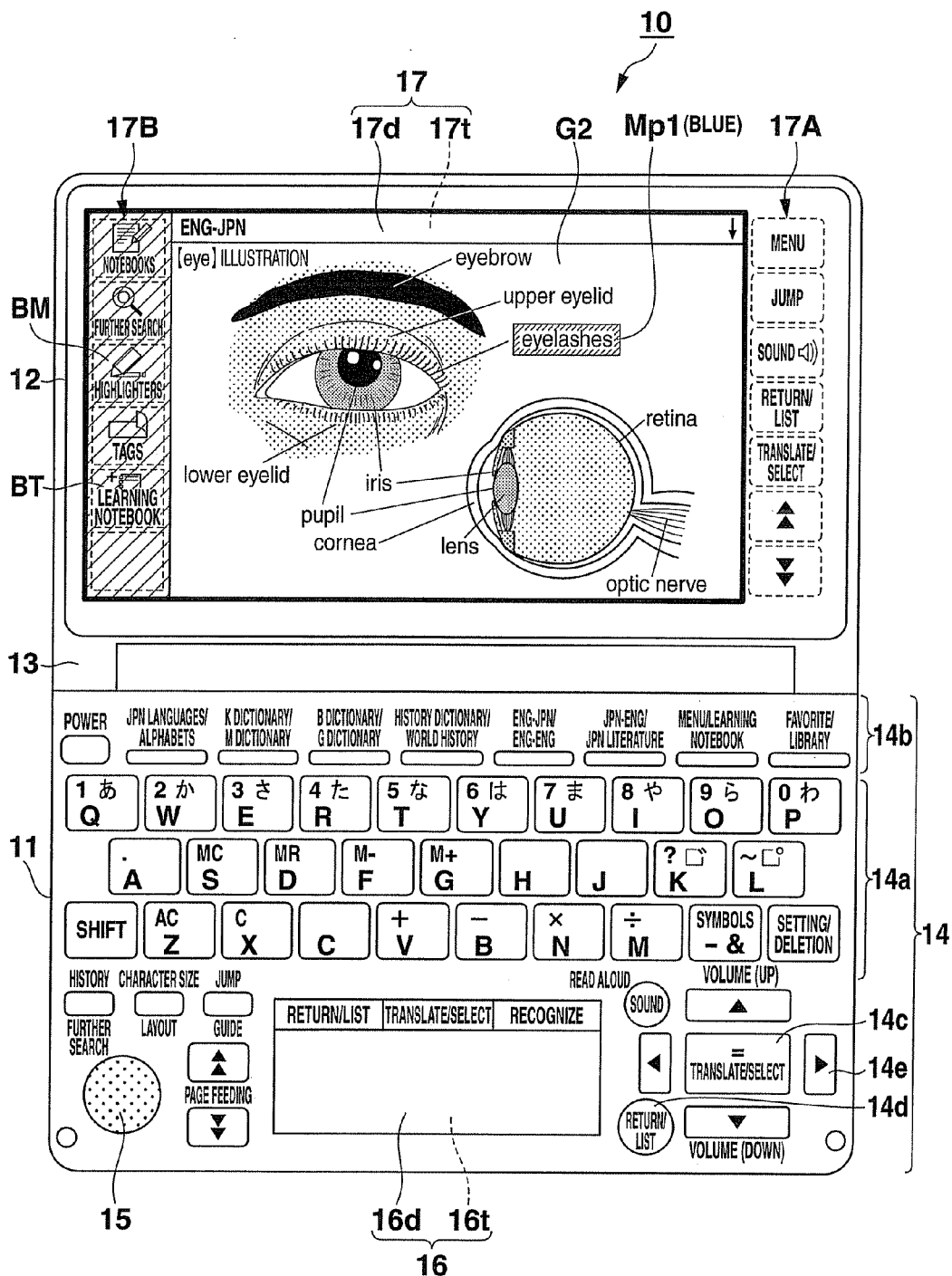
FIG. 1 is a front view showing an external configuration of an electronic dictionary device 10 according to an embodiment of the invention.

FIG. 1 is a front view showing an external configuration of an electronic dictionary device 10 according to an embodiment of the invention.

The electronic dictionary device 10 is configured as a portable device dedicated to an electronic dictionary explained below or as a personal digital assistant (PDA), a personal computer (PC), a mobile phone, an electronic book reader, a portable video game machine, or the like each of which has a dictionary function.

The electronic dictionary device 10 is so configured that a body case 11 and a cover case 12 are coupled with each other via a hinge part 13 so as to form a foldable case that can be opened and closed. At the surface of the body case 11 with the foldable case opened, there are provided a speaker 15, a handwriting input unit (subscreen) 16, and a key input unit (keyboard) 14 which includes character input keys 14a, dictionary specify keys 14b, "Translate/Select" key 14c, "Return/List" key 14d, cursor keys 14e, and others.

The handwriting input unit (subscreen) 16 has a structure where a touch position detecting device that detects a position touched by the user with a pen, a finger, or the like and a display device are integrally formed. The handwriting input unit 16 is so configured that, for example, a transparent touch panel 16t is laid on a 256×64 dot color liquid-crystal display screen 16d on the front side of the central part of the key input unit 14. As necessary, the input area of the handwriting input unit 16 is switched to a handwriting character (or kanji) input area for inputting a handwriting character, a button input area for various functions, or an area where those input areas are mixed.

A track resulting from handwriting input with the handwriting input unit 16 switched to the handwriting character input area is echoed back to the color liquid-crystal display screen 16d, which displays the track.

At the surface of the cover case 12, for example, a 480×320 dot touch panel display unit (main screen) 17 with a backlight is provided on almost all the surface. Like the handwriting input unit (subscreen) 16, the touch panel color display unit (main screen) 17 has a structure where a display device and a touch position detecting device that detects a position touched by the user with a pen, a finger, or the like are integrally formed. The touch panel color display unit 17 is so configured that a transparent touch panel 17t is laid on a color liquid-crystal display screen 17d.

To the right of the touch panel color display unit (main screen) 17, there is provided a touch key area 17A whose key notation is printed and which is configured to enable the pressing of part of the keys in the key input unit 14 to be performed by a touch operation.

To the left of the touch panel color display unit (main screen) 17, there is provided a touch icon area 17B where various icons are displayed which enable executable functions to be specified by a touch operation according to what is displayed.

For example, when a headword of a desired dictionary is searched for and an illustration display screen G2 on which an illustration and the like added to an expository content on the headword are provided is displayed on the touch panel color display unit 17, [Highlighter] icon BM for setting a highlighter mode that enables an arbitrary character string displayed on the illustration display screen G2 to be traced by a touch operation and highlighted with a color highlighter and [Learning Notebook] icon BT for calling up a learning notebook in which a character string in the user-specified dictionary highlighted with a color highlighter is classified and registered personally by the user are displayed on the touch icon area 17B.

In the concrete example of FIG. 1, the word "eyelashes" in the illustration is highlighted with blue highlighter Mp1 on the illustration display screen G2 on which an illustration associated with an expository content on the headword "eye" in [English-Japanese dictionary] is displayed.

FIG. 2 is a block diagram showing a configuration of the electronic circuitry of the electronic dictionary device 10.

The electronic dictionary device 10 is implemented using a computer which reads out programs recorded in various storage media or transferred programs and is controlled by the readout programs. The electronic circuitry of the device 10 includes a central processing unit (CPU) 21.

Connected to the CPU 21 are a memory 22, a storage medium read/write unit 24, a communication control unit 25, a key input unit 14, a handwriting input unit (subscreen) 16, a touch panel color display unit (main screen) 17, and others.

The CPU 21 controls the operation of each of the various parts of the circuitry according to a device control program prestored in the memory (flash ROM) 22, a device control program loaded into the memory 22 from an external storage medium 23, such as a ROM card, via a storage medium read/write unit 24, or a device control program loaded into the memory 22 from a Web server (in this case, a program server) 30 on the Internet via the communication control unit 25.

The device control program stored in the memory 22 is activated in response to an input signal corresponding to a user operation from the key input unit 14, handwriting input unit (subscreen) 16, and touch panel color display unit (main screen) 17, a communication signal with each Web server 30 on the Internet connected via the communication control unit 25, or a connection communication signal with a memory card (storage medium) 23, such as an EEPROM, a RAM, or a ROM externally connected via the storage medium read/write unit 24.

Stored as the device control program in the memory 22 are a system program that supervises the operation of the entire electronic dictionary device 10 and a communication program for performing data communication with each Web server on the Internet via the communication control unit 25 or with a user personal computer (PC) (not shown).

Further stored as the device control program are a dictionary search program 22a for controlling overall processes based on a dictionary database 22b stored in the main memory 22, including a headword search process for searching for a headword or like according to the input of a search character string, the process of reading and displaying an expository content (a translation, a semantic content, an example sentence, an illustration, and the like) corresponding to a retrieved headword, a learning notebook registry process of highlighting an arbitrary character string in the displayed expository content with a color highlighter and registering the highlighted character string in a highlighter learning notebook data memory 22c, and a learning notebook calling process of calling up and displaying the registered learning notebook.

Stored as the dictionary database (English) 22*b* are an [English-Japanese dictionary] where an expository content, including semantic contents (Japanese translations) of alphabetical headwords and illustrations, is written so as to correspond to the alphabetical headwords, a [Japanese-English dictionary] where an expository content, including semantic contents (English translations) of kanji/kana headwords and illustrations, is written so as to correspond to the kanji/kana headwords.

Furthermore, stored as the dictionary database (Japanese) 22*b* are [Japanese-language dictionary] where an expository content, including semantic contents of kanji/kana headwords and illustrations, is written so as to correspond to the kanji/kana headwords, a [kanwa (Chinese character) dictionary] where an expository content, including semantic contents of kanji headwords and illustrations, is written so as to correspond to the kanji headwords, an [Encyclopedia] where an expository content, including semantic contents of kanji/kana/alphabetical headwords and illustration, is written so as to correspond to the kanji/kana/alphabetical headwords, and the like.

When a desired character string (a word or a phrase) written in an expository content (a headword and its semantic content/illustration/usage/example sentence) on a headword retrieved from the headwords is highlighted with a highlighter and registered in a learning notebook, highlighter content 1, highlighter content 2, . . . corresponding to the respective highlighters, each of which is constituted by the dictionary name and headword highlighted with the highlighter, types (headword/illustration/usage/example sentence) of an expository content highlighted with the highlighter, and the color, character position, and character string highlighted with the highlighter, are stored in the highlighter learning notebook data memory 22*c*.

The electronic dictionary device 10 has not only the function of searching for a headword corresponding to a search character string input by the user and selectively displaying an expository content (headword and its semantic content/illustration/usage/example sentence) about the searched headword but also at least the following six functions:

(1) The function of specifying an arbitrary character string to highlight it with a highlighter on a display screen of an expository content (headword and its semantic content/illustration/usage/example sentence);

(2) The function of registering a highlighter content on a character string highlighted with a highlighter in the highlighter learning notebook data memory 22*c*;

(3) The function of, when a character string highlighted with a highlighter on the illustration display screen G2 is specified, jump-searching for an expository content on a headword linked with the character string is executed, and the expository content is displayed, not only displaying the headword highlighted with a highlighter of the same color but also registering a highlighter content in the highlighter learning notebook data memory 22*c*;

(4) The function of, when a highlighter-free character string on the illustration display screen G2 is specified, jump-searching for an expository content on a headword linked with the character string is executed, the expository content is displayed, and the headword is highlighted with a highlighter, highlighting the highlighter-free character string specified on the link-originating illustration display screen G2 with a highlighter of the same color and registering a highlighter content in the highlighter learning notebook data memory 22*c*;

(5) The function of, when an expository content (headword and its semantic content/illustration/usage/example sentence) on an arbitrary headword registered in the highlighter learning notebook data memory 22*c* is displayed, displaying a character string highlighted with a highlighter of the user-specified color in invisible form and thereafter cancelling the invisible display according to the input of "Translate/Select" key 14*c*; and (6) The function of, when a highlighter part displayed in invisible form on the illustration display screen G2 is displayed, jump-searching for an expository content on a headword linked with a character string in the highlighter part is executed, and the expository content is displayed, displaying the same character strings as that highlighted with the highlighter in the expository content in invisible form so as to highlight the same character strings with a highlighter of the same color and thereafter canceling the invisible display according to the input of "Translate/Select" key 14*c*.

The CPU 21 controls the operations of various parts of the circuitry according to the dictionary search program 22*a* so as to cause software and hardware to cooperate with each other, thereby realizing the aforementioned functions.

Next, the operation of the electronic dictionary device 10 with the above configuration will be explained.

Figure 3A:
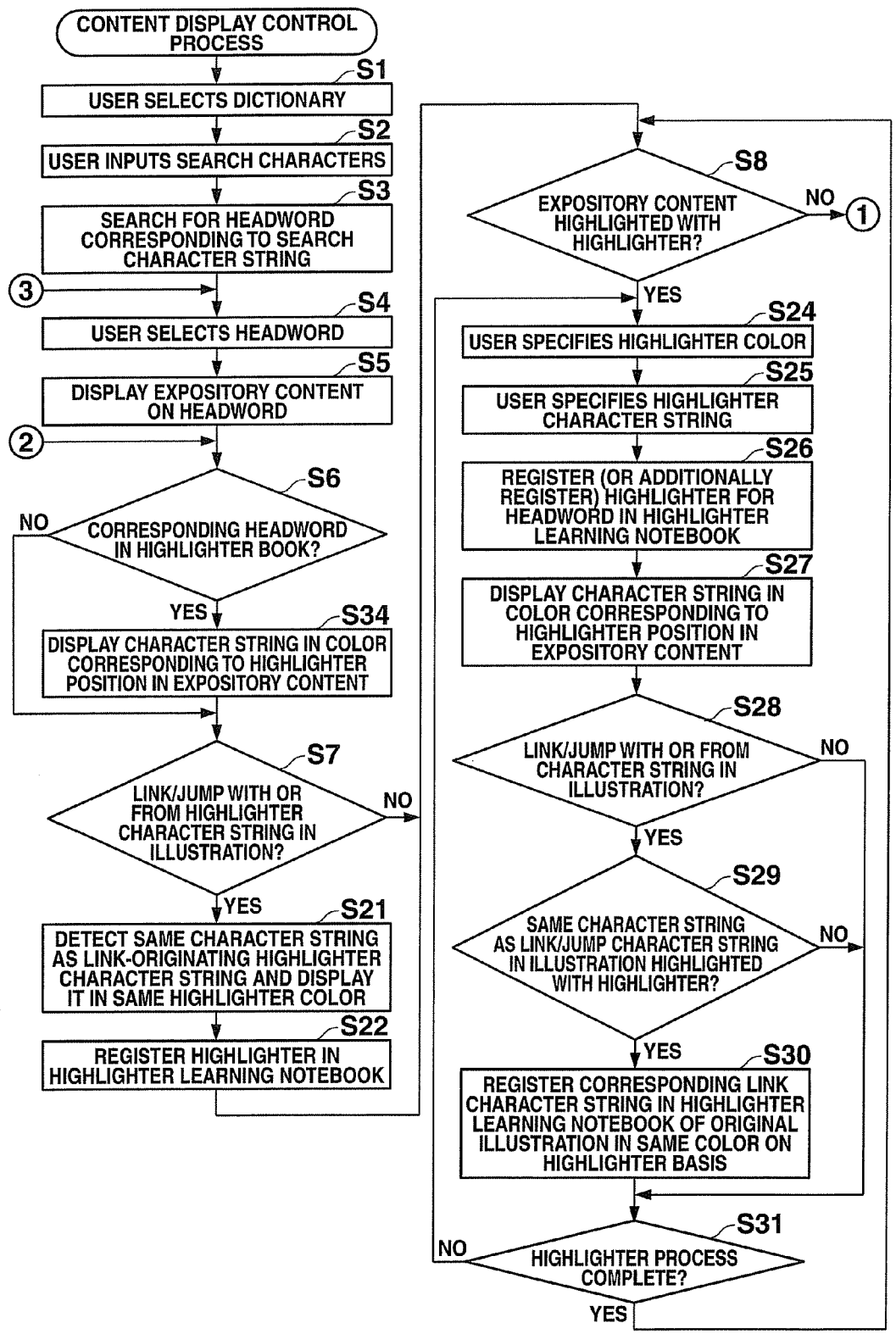
FIGS. 3A and 3B are flowcharts to explain a content display control process performed by a dictionary search program 22a of the electronic dictionary device 10.
Figure 3B:
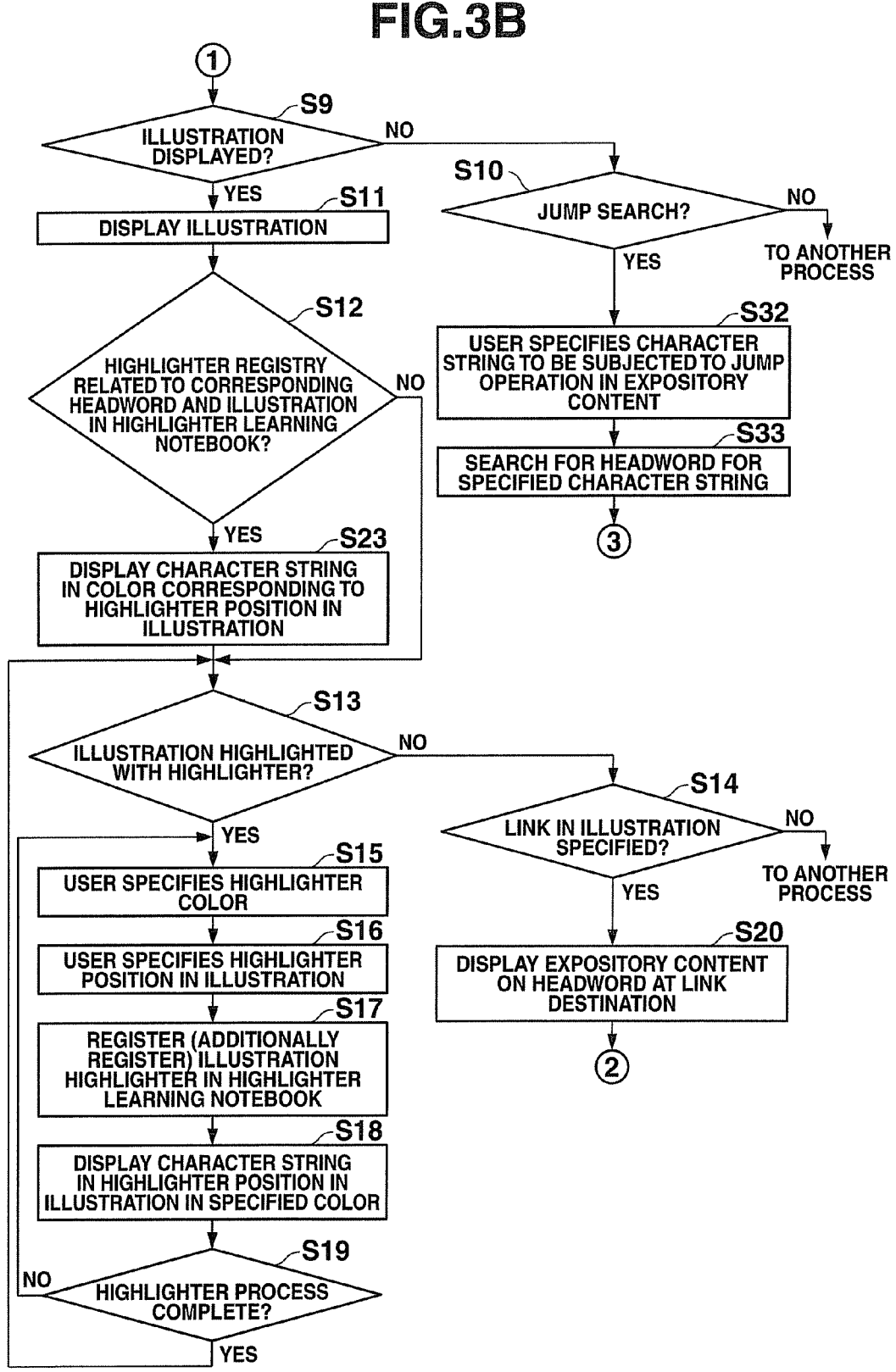

FIGS. 3A and 3B are flowcharts to explain a content display control process performed by the dictionary search program 22*a* of the electronic dictionary device 10.

(Highlighter Word Registration to Highlighter Leaning Notebook)

Figure 4:
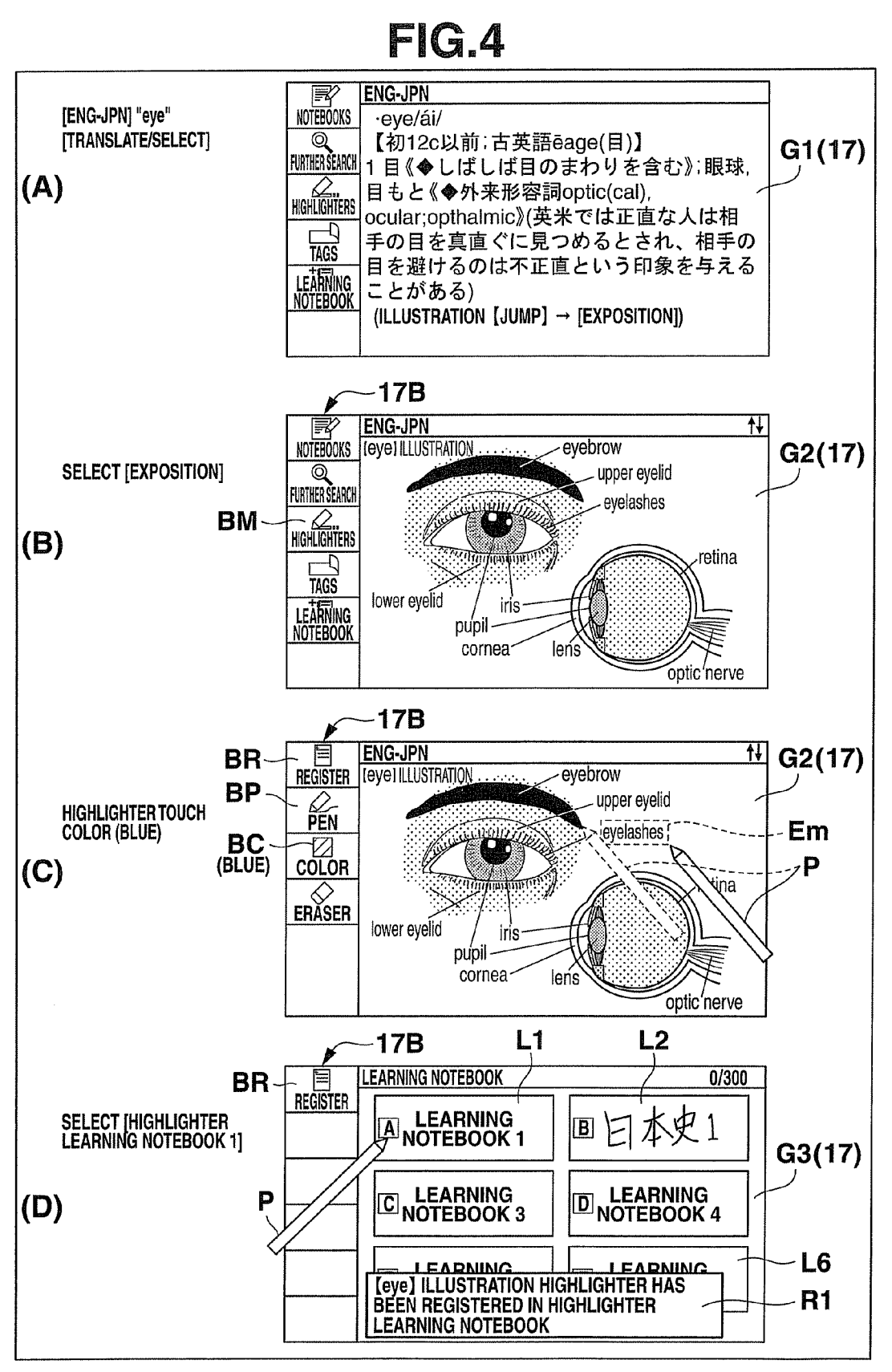

FIG. 4 shows a dictionary content display operation (part 1) in the content display control process of the electronic dictionary device 10.

Figure 5:
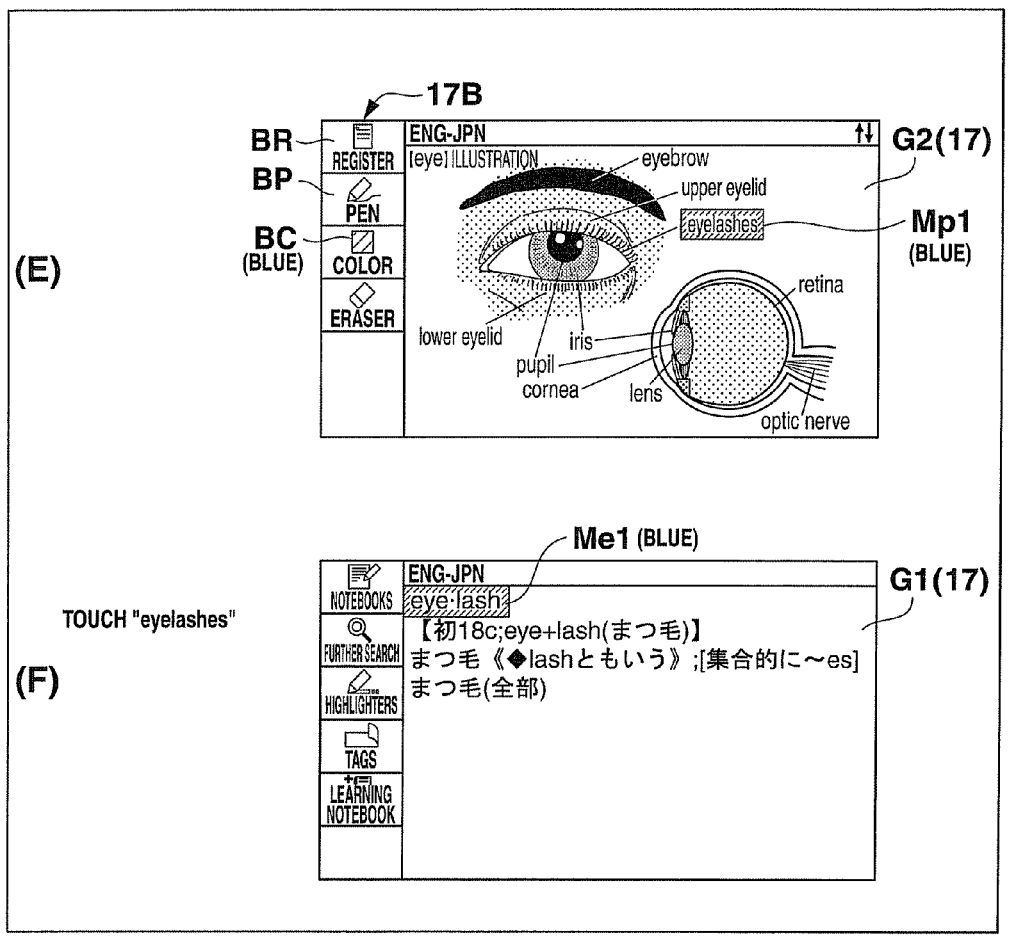
FIG. 5 shows a dictionary content display operation (part 2) accompanying the content display control process of the electronic dictionary device 10.

FIG. 5 shows a dictionary content display operation (part 2) in the content display control process of the electronic dictionary device 10.

Figure 6:
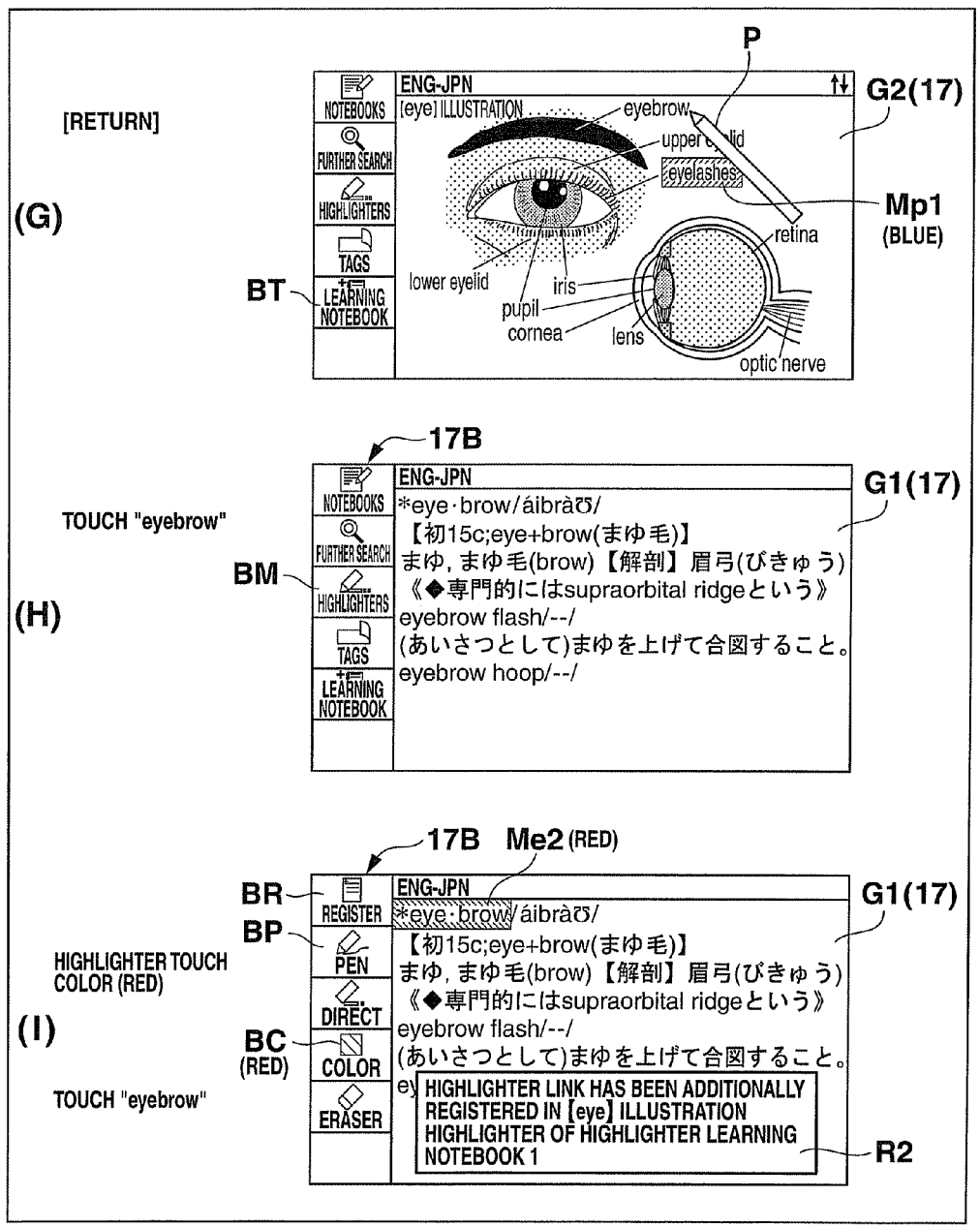
FIG. 6 shows a dictionary content display operation (part 3) accompanying the content display control process of the electronic dictionary device 10.

FIG. 6 shows a dictionary content display operation (part 3) in the content display control process of the electronic dictionary device 10.

Figure 7:
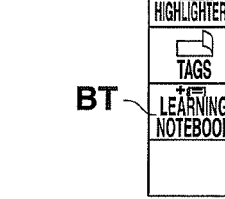
FIG. 7 shows a dictionary content display operation (part 4) accompanying the content display control process of the electronic dictionary device 10.

FIG. 7 shows a dictionary content display operation (part 4) in the content display control process of the electronic dictionary device 10.

With [English-Japanese dictionary] selected according to the operation of the dictionary specify key 14*b* (step S1), when a search character string "eye" is input according to the operation of the character input key 14*a* and "Translate/Select" key 14*c* is operated (step S2), headwords corresponding to the search character string "eye" are retrieved from the [English-Japanese dictionary] (22*b*) and displayed in list form (step S3).

When the headword "eye" is selected from the headwords displayed in list form and "Translate/Select" key 14*c* is pressed (step S4), an expository content (headword and its semantic content (including items of illustration/usage/example sentence)) corresponding to the selected headword "eye" is read from the [English-Japanese dictionary] (22*b*) as shown by (A) of FIG. 4 and displayed as an expository content display screen G1 on the touch panel color display unit 17 (step S5).

Then, it is determined whether a highlighter content on the headword "eye" corresponding to the currently displayed expository content display screen G1 has been registered in the highlighter learning notebook data memory 22*c* (step S6), whether the screen is the expository content display screen G1 displayed as a result of a link/jump search of a highlighter character string in the illustration (step S7), whether to highlight the currently displayed expository content with a highlighter (step S8), whether to display an illustration of the currently displayed expository content (step S9), or whether to make a jump search of the currently displayed expository content (step S10).

If it is determined that an illustration for the currently displayed expository content is to be displayed (Yes in step S9) as a result of touching item [Exposition] to display an illustration displayed on the expository content display screen G1 or of operating "Usage/Exposition" key (not shown) of the key input unit 14, an illustration for an expository content corresponding to the headword "eye" is read and displayed as an illustration display screen G2 on the touch panel color display unit 17 (step S11).

Then, it is determined whether a highlighter content about the illustration display screen G2 of the currently displayed headword "eye" has been registered in the highlighter learning notebook data memory 22c (step S12).

If it has been determined that a highlighter content about the illustration display screen G2 of the headword "eye" has not been registered (No in step S12), it is determined whether to highlight the displayed illustration with a highlighter (strep S13) or whether a linked character string in the illustration has been specified (step S14).

Here, if [Highlighter] icon BM in the touch icon area 17B is touched, it is determined that the displayed illustration is to be highlighted with a highlighter (Yes in step S13).

Then, as shown by (C) in FIG. 4, [Pen] icon BP is touched and a color (blue) is specified for the highlighter according to the touch operation of [Color] icon BC (step S15).

Thereafter, when the top left position and the bottom right position corresponding to the range EM of a character string "eyelashes" to be highlighted with a highlighter in the illustration are specified with a touch pen P (step S16), a learning notebook selection screen G3 for selecting highlighter learning notebooks [1] L1 to [6] L6 is displayed on the touch panel color display unit 17.

Here, if, for example, highlighter learning notebook [1] L1 has been selected and [Registry] icon BR has been touched, highlighter content 1 "blue (300, 285)-(370, 310) eyelashes" (see FIG. 2) caused to correspond to dictionary name "English-Japanese," type "figure," headword "eye" is registered in a memory area of learning notebook [1] in the highlighter learning notebook data memory 22c and a registry completion message R1 is displayed (step S17).

Then, as shown by (E) in FIG. 5, the character string "eyelashes" touched with a pen on the illustration display screen G2 of the headword "eye" is highlighted with a blue illustration highlighter Mp1 according to the registry of highlighter content 1 in learning notebook [1] of the highlighter learning notebook data memory 22c (step S18).

Here, when the user wants to add another illustration highlighter on the illustration display screen G2 of the headword "eye," if [Color] icon BC in the touch icon area 17B is touched, it is determined that the highlighter process is not complete (No in step S19) and the color of an illustration highlighter the user wants to add is specified by touching [Color] icon BC (step S15).

On the other hand, when the character string "eyelashes" highlighted with the illustration highlighter Mp1 (blue) is touched on the illustration display screen G2 where the character string "eyelashes" in the illustration of the headword "eye" is highlighted with the blue illustration highlighter Mp1 as shown by (E) in FIG. 5, it is determined that the highlighter process is complete (Yes in step S19) and that a linked character string in the illustration has been specified (Yes in step S14).

Then, an expository content (headword and its semantic content) corresponding to the headword "eyelashes" linked with the specified highlighter character string is read and displayed as an expository content display screen G1 of the headword "eyelashes" on the touch panel color display unit 17 as shown by (F) in FIG. 5 (step S20).

At this time, it is determined that the expository content display screen G1 is displayed as a result of a link/jump search of the highlighter character string in the illustration (Yes in step S7), the same character string (headword "eyelashes") as the link-originating highlighter character string "eyelashes" is detected and highlighted with a headword highlighter Me1 (blue) of the same color (step S21).

Then, highlighter content 1 "blue—line 2 first character to eighth character—eyelashes" caused to correspond to dictionary name "English-Japanese," type "headword," headword "eyelashes" is registered automatically in the memory area of learning notebook [1] of the highlighter learning notebook data memory 22c (step S22).

Thereafter, when "Return/List" key 14d is operated as shown by (G) in FIG. 6, an illustration display screen G2 where the same character string "eyelashes" in the illustration of the headword "eye" as that shown by (E) of FIG. 5 is highlighted with the illustration highlighter Mp1 (blue) is displayed (Yes in step S9→S11, Yes in step S12→S23).

Then, on the illustration display screen G2 of the headword "eye", when a highlighter-free character string "eyebrow" is touched, it is determined that a linked character string in the illustration has been specified (Yes in step S14).

Then, an expository content corresponding to the headword "eyebrow" linked with the specified character string is read and displayed as an expository content display screen G1 of the headword "eyebrow" on the touch panel color display unit 17 as shown by (H) in FIG. 6 (step S20).

At this time, it is determined that a highlighter content on the headword "eyebrow" corresponding to the currently displayed expository content display screen G1 has not been registered in the highlighter learning notebook data memory 22c (No in step S6) and that the currently displayed screen G1 is not an expository content display screen G1 displayed as a result of a link/jump search of a highlighter character string in the illustration (No in step S7).

Here, when [Highlighter] icon BM in the touch icon area 17B is touched, it is determined that a highlighter is to be added to the currently displayed expository content (Yes in step S8).

Then, as shown by (I) in FIG. 6, [Pen] icon BP is touched and a color (red) of the highlighter is specified according to the touch operation of [Color] icon BC (step S24).

Thereafter, when the headword "eyebrow," a character string to be highlighted with a highlighter in the expository content is specified with touch pen P (step S25), the learning notebook selection screen G3 for selecting highlighter learning notebooks [1] L1 to [6] L6 (see (D) in FIG. 4) is displayed on the touch panel color display unit 17.

Here, when, for example, highlighter learning notebook [1] L1 is selected with touch pen P and [Registry] icon BR is touched, highlighter content 1 "red—line 2 first character to eighth character—eyebrow" caused to correspond to dictionary name "English-Japanese," type "headword," headword "eyebrow" is registered in the memory area of learning notebook [1] of the highlighter learning notebook data memory 22c and then a registry completion message is displayed (step S26).

Then, the position of the character string "eyebrow" touched with the pen on the expository content display screen G1 of the headword "eyebrow" is highlighted with a red headword highlighter Me2 according to the registry of highlighter content 1 in learning notebook [1] of the highlighter learning notebook data memory 22*c* (step S27).

Here, if it has been determined that the currently displayed screen G1 is an expository content display screen G1 displayed as a result of a link/jump search of the character string "eyebrow" in the illustration (display screen G2) (Yes in step S28), it is determined whether the same character string as the link-originating character string "eyebrow" in the illustration has been highlighted with a highlighter (step S29).

In this case, it is determined that the same character string "eyebrow" as the link-originating character string "eyebrow" in the illustration has been highlighted with a highlighter (Yes in step S29). Therefore, highlighter content 2 "red . . . eyebrow" (see FIG. 2) about the corresponding character string "eyebrow" is additionally registered automatically in the memory area (22*c*) of highlighter learning notebook [1] registered on a highlighter basis in the illustration (see (G) in FIG. 6) of the link-originating headword "eye" and an additional registry completion message R2 is displayed (step S30).

Here, when the user wants to add another headword highlighter on the expository content display screen G1 of the headword "eyebrow," if [Color] icon BC in the touch icon area 17B is touched, it is determined that the highlighter process is not complete (No in step S31) and the color of a headword highlighter the user wants to add is specified by touching [Color] icon BC (step S24).

On the other hand, when "Return/List" key 14*d* is operated as shown by (J) in FIG. 7, it is determined that the highlighter process is complete (Yes in step S31) and the same illustration display screen G2 of the headword "eye" as that shown by (G) in FIG. 6 is displayed (Yes in step S9→S11).

At this time, it is determined that highlighter content 1 "blue (300, 285)-(370, 310) eyelashes" and highlighter content 2 "red . . . eyebrow" about the illustration of the headword "eye" have been registered in the memory area of learning notebook [1] of the highlighter learning notebook data memory 22*c* (Yes in step S12). Accordingly, the character string "eyelashes" is highlighted with the illustration highlighter Mp1 (blue) and the character string "eyebrow" is highlighted with illustration highlighter Mp2 (red) (Yes in step S12→S23).

Then, when a highlighter-free character string "pupil" is touched on the illustration display screen G2 of the headword "eye" (see (J) in FIG. 7), it is determined that a linked character string in the illustration has been specified (Yes in step S14).

Then, an expository content corresponding to a headword "pupil 2" linked with the specified character string is read and displayed as an expository content display screen G1 of the headword "pupil 2" on the touch panel color display unit 17 as shown by (K) in FIG. 7 (step S20).

Here, in a jump search mode set by operating [Jump] key (not shown) of the key input unit 14 (Yes in step S10), when a character string "pupil" on the expository content display screen G1 (see (K) in FIG. 7) is specified and "Translate/Select" key 14*c* is operated (step S32), a headword corresponding to the specified character string "pupil" is searched for and displayed in list form (step S33).

Then, when the headword "pupil 1" is selected from the headwords displayed in list form according to the user operation and "Translate/Select" key 14*c* is operated (step S4), an expository content corresponding to the selected headword "pupil 1" is read from [English-Japanese dictionary] (22*b*) as shown by (L) in FIG. 7 and displayed as an expository content display screen G1 on the touch panel color display unit 17 (step S5).

Here, when [Highlighter] icon BM in the touch icon area 17B is touched, it is determined that a highlighter is to be added to the currently displayed expository content (Yes in step S8).

Then, as shown by (M) in FIG. 7, [Pen] icon BP is touched and then [Color] icon BC is touched, thereby specifying a color (yellow) of the highlighter (step S24).

Thereafter, when the headword "pupil," a character string to be highlighted with a highlighter in the expository content, is specified with touch pen P (step S25), the learning notebook selection screen G3 for selecting highlighter learning notebooks [1] L1 to [6] L6 (see (D) in FIG. 4) is displayed on the touch panel color display unit 17.

Here, when, for example, highlighter learning notebook [1] L1 is selected with touch pen P and [Registry] icon BR is touched, highlighter content 1 "yellow—line 2 first character to eighth character—pupil" caused to correspond to dictionary name "English-Japanese," type "headword," headword "pupil" is registered in the memory area of learning notebook [1] of the highlighter learning notebook data memory 22*c* and then a registry completion message is displayed (step S26).

Then, the position of the character string "pupil" touched with the pen on the expository content display screen G1 of the headword "pupil 1" is highlighted with a yellow headword highlighter Me3 according to the registry of highlighter content 1 about learning notebook [1] of the highlighter learning notebook data memory 22*c* (step S27).

Here, if it has been determined that the currently displayed screen G1 is an expository content display screen G1 displayed as a result of a link/jump search of the character string "pupil" in the illustration (display screen G2) (Yes in step S28), it is determined that the same character string as the link-originating character string "pupil" in the illustration has been highlighted with a highlighter (step S29).

In this case, it is determined that the same character string "pupil" as the link-originating character string "pupil" in the illustration has been highlighted with a highlighter (Yes in step S29). Therefore, highlighter content 3 "yellow . . . pupil" (see FIG. 2) about the corresponding character string "pupil" is additionally registered automatically in the memory area (22*c*) of highlighter learning notebook [1] registered in highlighter in the illustration (see (J) in FIG. 7) of the link-originating headword "eye" and an additional registry completion message R2 is displayed (step S30).

As described above, when an illustration highlighter Mp1 (blue) is added by specifying an arbitrary color (blue) and an arbitrary character string "eyelashes" on the illustration display screen G2 of an expository content on the headword "eye," the highlighter Mp1 is registered as a highlighter content on an illustration of the headword "eye" in the highlighter learning notebook data memory 22*c*.

Then, when a highlighter character string "eyelashes" highlighted with the illustration highlighter Mp1 (blue) on the illustration display screen G2 of the headword "eye" is specified, an expository content display screen G1 linked with the highlighter character string "eyelashes" as a headword is jump-searched for and displayed. At the same time, the character string "eyelashes" of the headword is not only highlighted with a headword highlighter Me1 (blue) of the same color as the illustration highlighter Mp1 (blue) but also registered as a highlighter content on headword an expository content on the headword "eyelashes" in the highlighter learning notebook data memory 22*c*.

Furthermore, when a headword highlighter Me2 (red) is added by specifying an arbitrary color (red) and an arbitrary character string (headword) "eyebrow" in a state where a highlighter-free character string "eyebrow" has been specified on the illustration display screen G2 of the headword "eye" and an expository content display screen G1 linked with the character string "eyebrow" as a headword has been jump-searched for and displayed, the headword highlighter Me2 is registered as a highlighter content on headword an expository content on the headword "eyebrow" in the highlighter learning notebook data memory 22c. At the same time, when it is determined that headword highlighter Me2 (red) has been added because the same character string (headword) "eyebrow" as the link-originating character string "eyebrow" on the illustration display screen G2 of the headword "eye" has been specified, the illustration highlighter Mp2 (red) of the same color is added to the character string "eyebrow" on the illustration display screen G2 of the link-originating headword "eye" and is additionally registered as a highlighter content on the illustration of the headword "eye."

Therefore, an arbitrary word in the illustration of a desired headword can be highlighted with an illustration highlighter of an arbitrary color and registered on a highlighter basis. In addition to this, when a highlighter word in the illustration is specified to make a jump to an expository content linked with the highlighter word as a headword, a headword in the expository content is highlighted with a headword highlighter of the same color and registered on a highlighter basis automatically. Moreover, in an expository content linked with an arbitrary word in the illustration of a desired headword and displayed as a result of a jump operation, when a headword, the same character string as the link-originating word, is highlighted with a headword highlighter of an arbitrary color and registered on a highlighter basis, the word in the link-originating illustration is also highlighted with an illustration highlighter of the same color and registered automatically.

Therefore, each word in an illustration and an expository content linked with each word as a headword can share highlighter words.

(Word Learning with Highlighter Learning Notebook)

Figure 8:
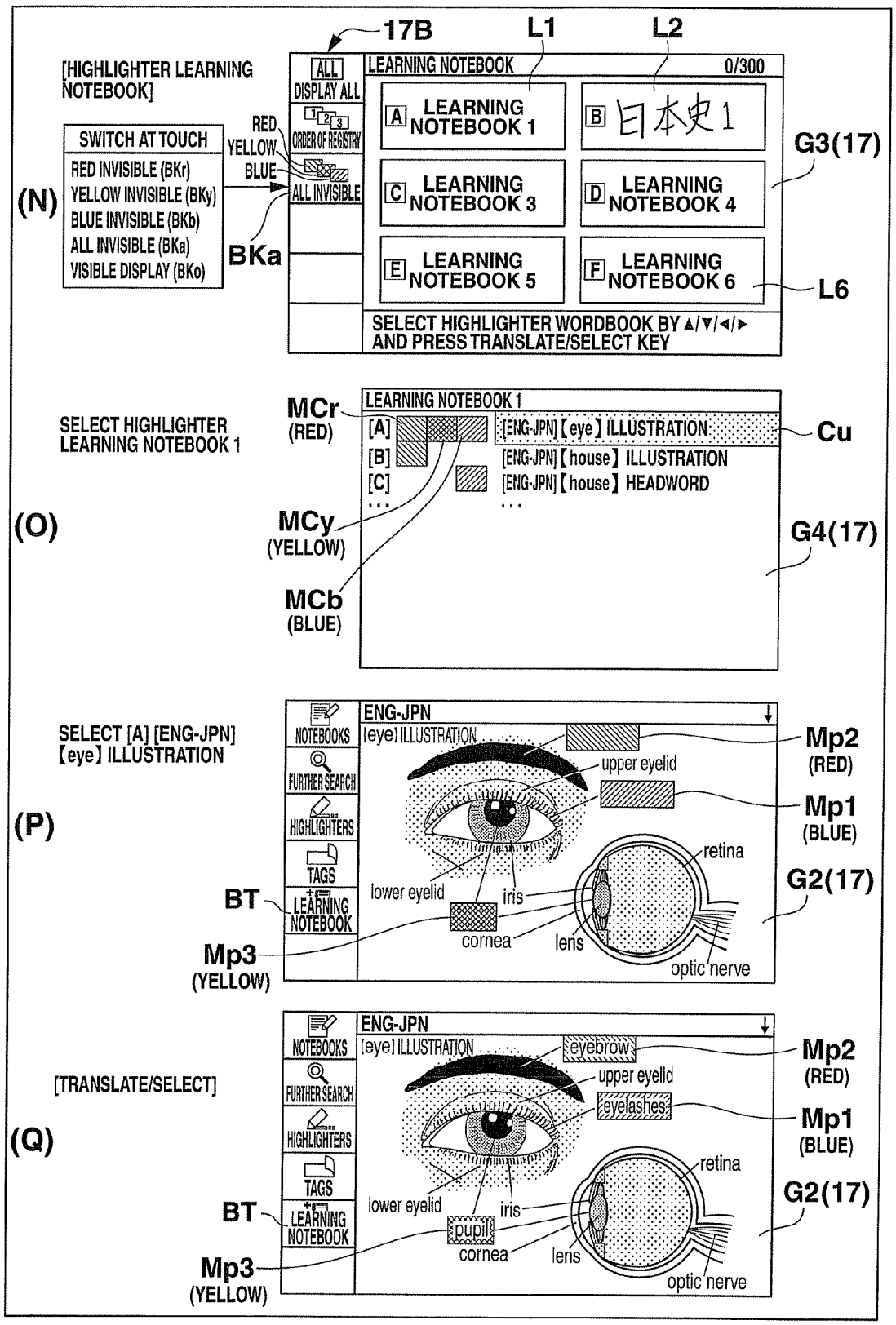
FIG. 8 shows a dictionary content display operation (part 5) accompanying the content display control process of the electronic dictionary device 10.

FIG. 8 shows a dictionary content display operation (part 5) in the content display control process of the electronic dictionary device 10.

Figure 9:
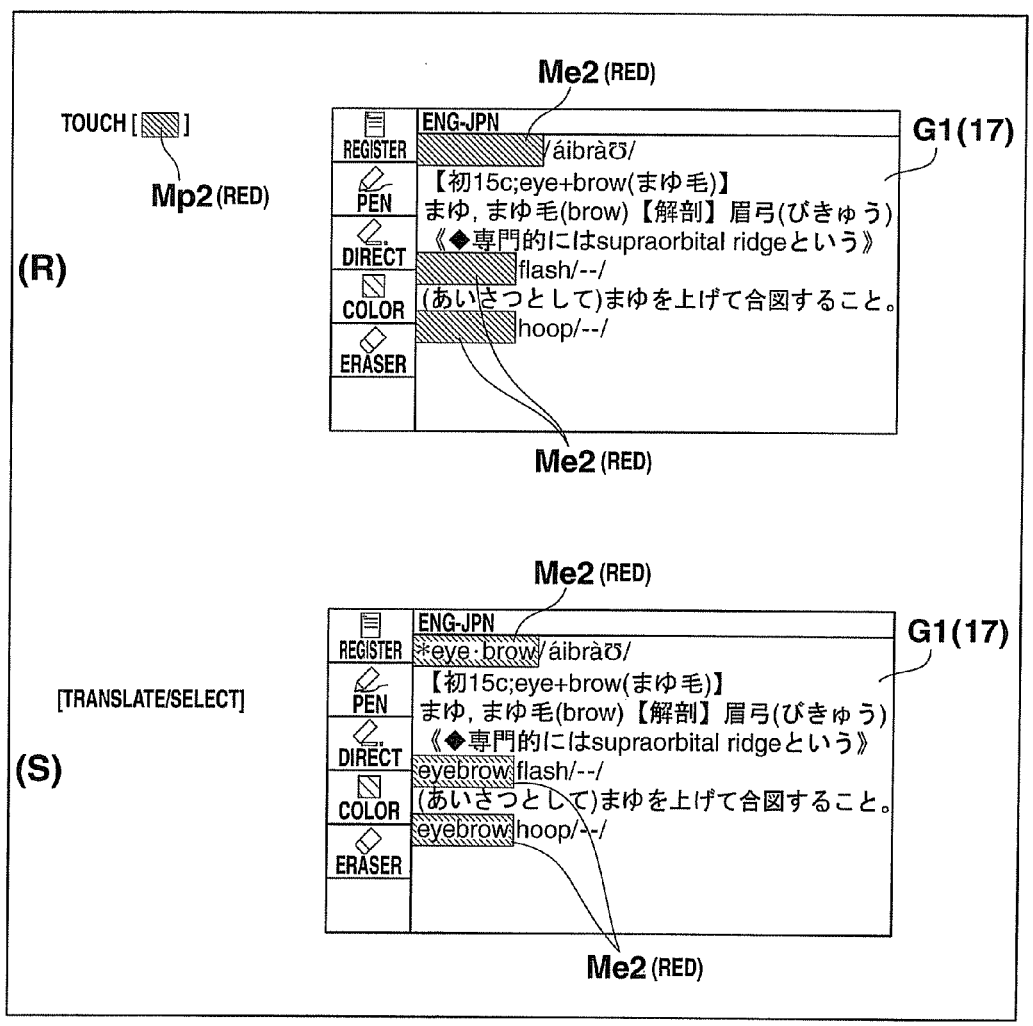
FIG. 9 shows a dictionary content display operation (part 6) accompanying the content display control process of the electronic dictionary device 10.

FIG. 9 shows a dictionary content display operation (part 6) in the content display control process of the electronic dictionary device 10.

Figure 10:
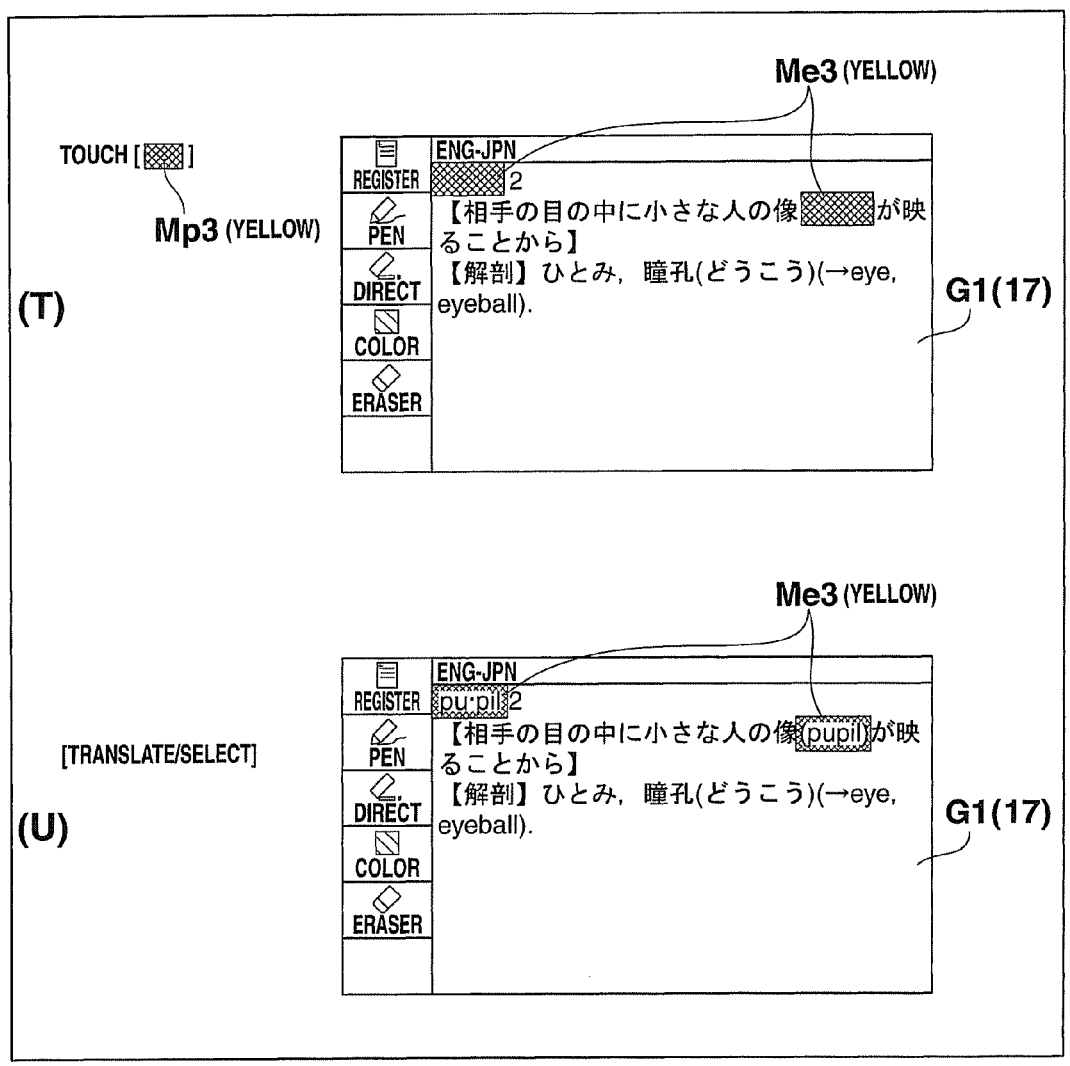
FIG. 10 shows a dictionary content display operation (part 7) accompanying the content display control process of the electronic dictionary device 10.

FIG. 10 shows a dictionary content display operation (part 7) in the content display control process of the electronic dictionary device 10.

In an explanation of a word learning operation with the highlighter learning notebook, the process of displaying a learning notebook selection screen G3 (see (N) in FIG. 8), the process of displaying a highlighter registry list screen G4 (see (O) in FIG. 8), and the process of displaying a character string highlighted with a highlighter in invisible form and cancelling the invisible display by the operation of "Translate/Select" key 14c have already been realized in the field of the expository content display screen G1. Therefore, an explanation of those processes with reference to a detailed flowchart will be omitted.

When a highlighter learning notebook is specified by operating the dictionary specify keys 14b, a learning notebook selection screen G3 for selecting highlighter learning notebooks [1] L1 to [6] L6 is displayed on the touch panel color display unit 17 as shown by (N) in FIG. 8.

At this time, in the touch icon area 17B, icons for selectively specifying the color of a highlighter whose character string is displayed in invisible form ([red invisible] BKr→[yellow invisible] BKy→[blue invisible] BKb→[all invisible] BKa→[visible display] BK0) are switched sequentially each time a touch operation is performed.

If in the learning notebook selection screen G3, for example, highlighter learning notebook [1] L1 is touched and selected as shown by (O) in FIG. 8, a highlighter registry list screen G4 that lists dictionaries, headwords, types, and highlighter colors registered in highlighter learning notebook [1] L1 is displayed on the touch panel color display unit 17.

Specifically, under item [A] selected by a reversed cursor Cu, highlighter color representations MCr (red), MCy (yellow), MCb (blue) indicating that highlighter character strings (words) of all the colors, red, yellow, and blue, have been registered in an illustration corresponding to a headword "eye" in the [English-Japanese dictionary] are arranged.

On the learning notebook selection screen G3 shown by (N) in FIG. 8, [All invisible] icon BKa is displayed in the touch icon area 17B and highlighter learning notebook [1] L1 is selected. Then, on highlighter registry list screen G4 shown by (O) in FIG. 8, item [A] ([ENG-JPN] [eye] illustration) is selected with the reversed cursor Cu and "Translate/Select" key 14c is operated.

Then, as shown by (P) in FIG. 8, according to a highlighter content (highlighter content 1 "blue (300, 285)-(370, 310) eyelashes"/highlighter content 2 "red . . . eyebrow"/highlighter content 3 "yellow . . . pupil") on an illustration corresponding to the headword "eye" of the [English-Japanese dictionary] registered in the memory area of wordbook [1] of the highlighter learning notebook data memory 22c, an illustration display screen G2 corresponding to the headword "eye" is displayed, a character string "eyelashes" in the illustration is highlighted with an illustration highlighter Mp1 (blue), a character string "eyebrow" is highlighted with an illustration highlighter Mp2 (red), a character string "pupil" is highlighted with an illustration highlighter Mp3 (yellow), and all of the character strings are displayed in invisible form (Yes in step S9→S11, Yes in step S12→S23).

Here, when "Translate/Select" key 14c is operated, the invisible display of the character strings "eyelashes," "eyebrow," "pupil" highlighted with the illustration highlighters Mp1 (blue), Mp2 (red), Mp3 (yellow) respectively is cancelled as shown by (Q) in FIG. 8.

Therefore, the function of registering and learning highlighter words not only on the expository content display screen G1 but also on the illustration display screen G2 can be realized.

On the other hand, if the illustration highlighter Mp2 (red) is touched on the illustration display screen G2 of the headword "eye" with its highlighter-added character string in invisible form shown by (P) in FIG. 8, it is determined that a linked character string in the illustration has been specified (Yes in step S14).

Then, as shown by (R) in FIG. 9, an expository content (headword and its semantic content) corresponding to the headword "eyebrow" linked with the character string highlighted with the specified illustration highlighter Mp2 (red) is read and displayed as an expository content display screen G1 of the headword "eyebrow" on the touch panel color display unit 17 (step S20).

At this time, highlighter content 1 "red—second line first character to eighth character—eyebrow" caused to correspond to dictionary name "English-Japanese," type "headword," headword "eyebrow" has been registered in the memory area of learning notebook [1] of the highlighter learning notebook data memory 22c (Yes in step S6). Accordingly, the headword "eyebrow" on the expository content display screen G1 is highlighted with headword highlighter (red) Me2 and displayed with its character string invisible (step S34).

Furthermore, since it is determined that the currently displayed expository content display screen G1 is an expository content display screen G1 displayed as a result of a link/jump search of a highlighter character string in the illustration (Yes in step S7), all the same character strings as the link-originating highlighter character string "eyebrow" are detected and highlighted with headword highlighter Me2 (red) of the same color and the resulting character strings are displayed in invisible form (step S21).

Then, highlighter content 2 "red—sixth line first character to eighth character—eyebrow," highlighter content 3 "red—eighth line first character to eighth character—eyebrow" each caused to correspond to dictionary name "English-Japanese," type "headword," headword "eyebrow" have been additionally registered automatically in the memory area of learning notebook [1] of the highlighter learning notebook data memory 22c (step S22).

Here, when "Sound" key on the key input unit 14 is operated, the sound of reading the character string "eyebrow" highlighted with headword highlighter (red) Me2 and displayed in invisible form is output at the speaker 15.

Then, when "Translate/Select" key 14c is operated, the invisible display of the character string "eyebrow" highlighted with headword highlighter Me2 (red) is cancelled as shown by (S) in FIG. 9.

On the other hand, if the illustration highlighter Mp3 (yellow) is touched on the illustration display screen G2 of the headword "eye" with its highlighter-added character string in invisible form shown by (P) in FIG. 8, it is determined that a linked character string in the illustration has been specified (Yes in step S14).

Then, as shown by (T) in FIG. 10, an expository content (headword and its semantic content) corresponding to the headword "pupil 2" linked with the character string highlighted with the specified illustration highlighter Mp3 (yellow) is read and displayed as an expository content display screen G1 of the headword "pupil 2" on the touch panel color display unit 17 (step S20).

At this time, highlighter content 1 "yellow—second line first character to sixth character—pupil" caused to correspond to dictionary name "English-Japanese," type "headword," headword "pupil" has been registered in the memory area of learning notebook [1] of the highlighter learning notebook data memory 22c (Yes in step S6). Accordingly, the headword "pupil" on the expository content display screen G1 is highlighted with headword highlighter (yellow) Me3 and displayed with its character string invisible (step S34).

Furthermore, since it is determined that the currently displayed expository content display screen G1 is an expository content display screen G1 displayed as a result of a link/jump search of a highlighter character string in the illustration (Yes in step S7), all the same character strings as the link-originating highlighter character string "pupil" are detected and highlighted with headword highlighter Me3 (yellow) of the same color and the resulting character strings are displayed in invisible form (step S21).

Then, highlighter content 2 "yellow—third line first character to sixth character—pupil" caused to correspond to dictionary name "English-Japanese," type "headword," headword "pupil" has been additionally registered automatically in the memory area of learning notebook [1] of the highlighter learning notebook data memory 22c (step S22).

Then, when "Translate/Select" key 14c is operated, the invisible display of the character string "pupil" highlighted with headword highlighter Me3 (yellow) is cancelled as shown by (U) in FIG. 10.

Therefore, each word in an illustration and an expository content linked using each word as a headword can share highlighter words. In addition to this, the illustration display screen G2 that displays each highlighter word in invisible form cooperates with the expository content display screen G1 that displays the same highlighter word in invisible form as a result of a jump operation based on a link with the highlighter word on the illustration display screen G2, thereby realizing the function of enabling the user to learn highlighter words more effectively.

The methods of the individual processes performed by the electronic dictionary device 10 and the database described in the embodiment, that is, the methods of the content display control process and others according to the dictionary search program 22a shown in the flowcharts of FIGS. 3A and 3B and the dictionary database 22b, can be stored in the external storage medium 23, such as a memory card (e.g., a ROM card or a RAM card), a magnetic disk (e.g., a Floppy® disk or a hard disk), an optical disk (e.g., a CD-ROM or a DVD), or a semiconductor memory, in the form of programs the computer can execute. Then, the external storage media 23 can be delivered. A computer loads the program stored in the external storage medium 23 into the storage device (22). The computer is controlled by the loaded program, thereby realizing the function of displaying each highlighter word in invisible form by causing the function of registering and displaying a highlighter word on the illustration display screen G2 to cooperate with the function of registering and displaying a highlighter word on the expository content display screen G1 as explained in the embodiment, which enables the same processes in the aforementioned methods to be carried out.

Furthermore, the data of the programs which realize the above methods can be transferred in the form of program code through a network N. The program data can be loaded into a computer connected to the network N via the communication control unit 25, thereby realizing the function of displaying each highlighter word in invisible form by causing the function of registering and displaying a highlighter word on the illustration display screen G2 to cooperate with the function of registering and displaying a highlighter word on the expository content display screen G1.

The present invention is not limited to the above embodiment and, on the basis of available skills in the present or future implementation phase, may be practiced or embodied in still other ways without departing from the spirit or character thereof. The embodiment includes inventions of different stages and therefore various inventions can be extracted by combining suitably a plurality of structural requirements disclosed in the embodiment. For example, even if some are removed from all of the structural requirements shown in the embodiment or some structural requirements are combined in a different mode, the resulting configuration can be extracted as an invention, provided that the subject to be achieved by the invention is accomplished and the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic illustrated dictionary device, comprising:
a dictionary storing unit configured to store dictionary data in which each headword, expository content, and illustration are associated with one another, the illustration including a character string which is searchable;
an in-illustration textual content display unit configured to execute a process of, when an arbitrary character string in an arbitrary illustration is specified according to a user operation, displaying an expository content having the specified character string as a headword on a display unit;
an illustration highlighter adding unit configured to highlight an arbitrary character string in the displayed illustration with a highlighter according to a user operation;
a link destination highlighter adding unit configured to execute a process of, when the in-illustration textual content display unit displays an expository content having the character string as a headword highlighted with the highlighter by the illustration highlighter adding unit on the display unit, detecting the same character string in the displayed expository content as the character string highlighted with the highlighter as a link destination and highlighting the same character string with a highlighter;
an illustration highlighter character string hiding unit configured to execute a process of, when an illustration associated with an expository content of an arbitrary headword is displayed on the display unit according to a user operation, displaying a character string highlighted with a highlighter by the illustration highlighter adding unit in invisible form; and
a link destination highlighter character string hiding unit configured to execute a process of, when the in-illustration textual content display unit displays an expository content having a character string as a headword highlighted with a highlighter by the illustration highlighter adding unit on the display unit, displaying a character string highlighted with a highlighter by the link destination highlighter adding unit in invisible form.

2. The electronic illustrated dictionary device according to claim 1, further comprising:
an illustration highlighter character string hiding cancel unit configured to cancel the invisible display of a character string highlighted with a highlighter by the illustration highlighter character string hiding unit according to a user operation; and
a link destination highlighter character string hiding cancel unit configured to cancel the invisible display of a character string highlighted with a highlighter by the link destination highlighter character string hiding unit according to a user operation.

3. The electronic illustrated dictionary device according to claim 2, further comprising:
a link destination headword highlighter adding unit configured to execute a process of, when the in-illustration textual content display unit displays a expository content having a character string as a headword not highlighted with a highlighter by the illustration highlighter adding unit on the display unit, highlighting the headword of the displayed expository content with a highlighter according to a user operation; and
a link originating illustration highlighter adding unit configured to execute a process of, when the link destination headword highlighter adding unit highlights the headword of the expository content with a highlighter, highlighting a character string in an illustration from which a link with the headword originates with a highlighter.

4. The electronic dictionary device according to claim 3, wherein:
the illustration highlighter adding unit highlights an arbitrary character string in an illustration displayed on the illustration display unit with a highlighter of an arbitrary color according to a user operation, and
the link destination highlighter adding unit executes a process of, when the in-illustration textual content display unit displays an expository content having a character string as a headword highlighted with a highlighter by the illustration highlighter adding unit on the display unit, detecting the same character string as a character string highlighted with a highlighter in the displayed expository content and highlighting the same character string with a highlighter of the same color.

5. The electronic dictionary device according to claim 3, wherein:
the link destination headword highlighter adding unit executes a process of, when the in-illustration textual content display unit displays an expository content having a character string as a headword not highlighted with a highlighter by the illustration highlighter adding unit on the display unit, highlighting a headword of the displayed expository content with a highlighter of an arbitrary color according to a user operation, and
the link originating illustration highlighter adding unit executes a process of, when the link destination headword highlighter adding unit highlights the headword of the expository content with a highlighter, highlighting a character string in an illustration from which a link with the headword originates with a highlighter of the same color.

6. An illustrated dictionary display method, comprising:
executing a dictionary storing process of storing dictionary data in a memory in which each headword, expository content, and illustration are associated with one another, the illustration including a character string which is searchable;
executing an in-illustration textual content display process of, when an arbitrary character string in an arbitrary illustration is specified according to a user operation, displaying an expository content having the specified character string as a headword on a display unit;
executing an illustration highlighter adding process of highlighting an arbitrary character string in the displayed illustration with a highlighter according to a user operation;
executing a link destination highlighter adding process of, when the in-illustration textual content display process displays an expository content having the character string as a headword highlighted with the highlighter by the illustration highlighter adding process on the display unit, detecting the same character string in the displayed expository content as the character string highlighted with the highlighter as a link destination and highlighting the same character string with a highlighter;
executing an illustration highlighter character string hiding process of, when an illustration associated with an expository content of an arbitrary headword is displayed on the display unit according to a user operation, displaying a character string highlighted with a highlighter by the illustration highlighter adding process in invisible form; and
executing a link destination highlighter character string hiding process of, when the in-illustration textual content display process displays an expository content having a character string as a headword highlighted with a highlighter by the illustration highlighter adding process on the display unit, displaying a character string highlighted with a highlighter by the link destination highlighter adding process in invisible form.

7. A non-transitory computer-readable storage medium having program code stored thereon for controlling a computer of an electronic device comprising a display unit and a memory to perform illustrated dictionary display control, the program code comprising:

executing a dictionary storing process of storing dictionary data in a memory in which each headword, expository content, and illustration are associated with one another, the illustration including a character string which is searchable;

executing an in-illustration textual content display process of, when an arbitrary character string in an arbitrary illustration is specified according to a user operation, displaying an expository content having the specified character string as a headword on a display unit;

executing an illustration highlighter adding process of highlighting an arbitrary character string in the displayed illustration with a highlighter according to a user operation;

executing a link destination highlighter adding process of, when the in-illustration textual content display process displays an expository content having the character string as a headword highlighted with the highlighter by the illustration highlighter adding process on the display unit, detecting the same character string in the displayed expository content as the character string highlighted with the highlighter as a link destination and highlighting the same character string with a highlighter;

executing an illustration highlighter character string hiding process of, when an illustration associated with an expository content of an arbitrary headword is displayed on the display unit according to a user operation, displaying a character string highlighted with a highlighter by the illustration highlighter adding process in invisible form; and executing a link destination highlighter character string hiding process of, when the in-illustration textual content display process displays an expository content having a character string as a headword highlighted with a highlighter by the illustration highlighter adding process on the display unit, displaying a character string highlighted with a highlighter by the link destination highlighter adding process in invisible form.

\* \* \* \* \*